No. 847,917. PATENTED MAR. 19, 1907.
A. T. DAWSON & J. HORNE.
AMMUNITION HOISTING APPARATUS FOR ORDNANCE.
APPLICATION FILED DEC. 7, 1903.
4 SHEETS—SHEET 1.
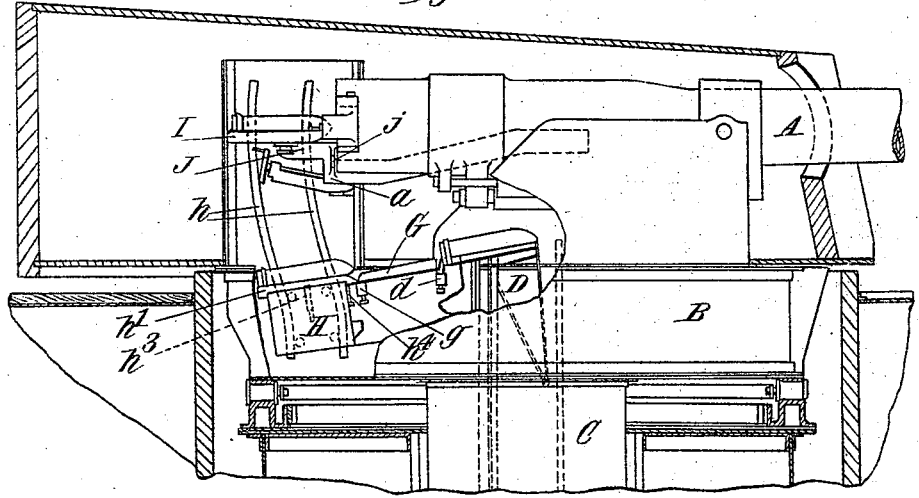
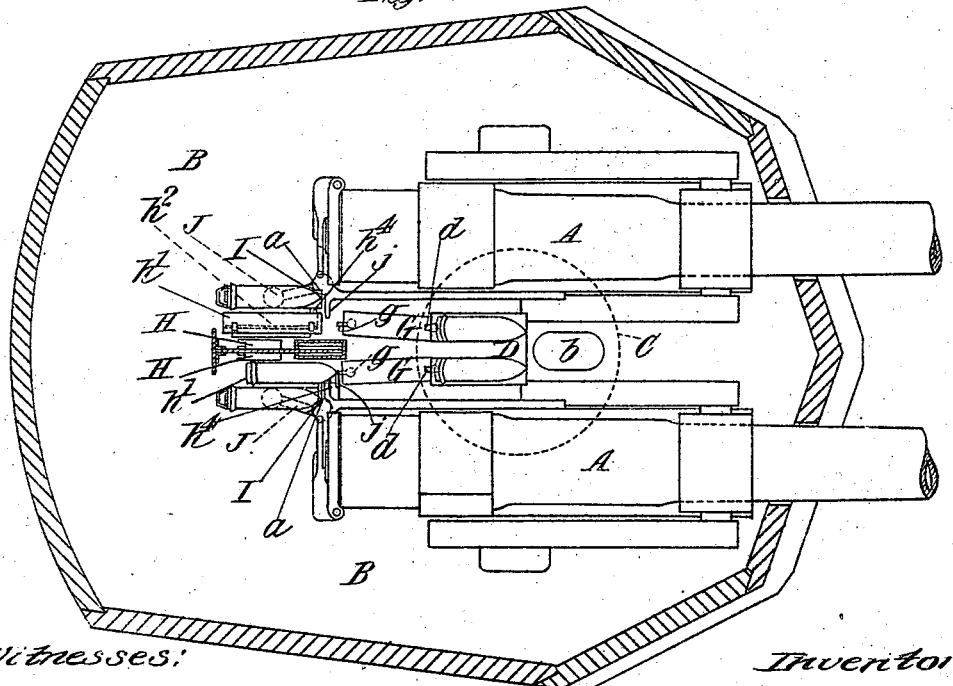
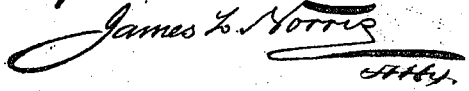

No. 847,917. PATENTED MAR. 19, 1907.
A. T. DAWSON & J. HORNE.
AMMUNITION HOISTING APPARATUS FOR ORDNANCE.
APPLICATION FILED DEC. 7, 1903.
4 SHEETS—SHEET 2.
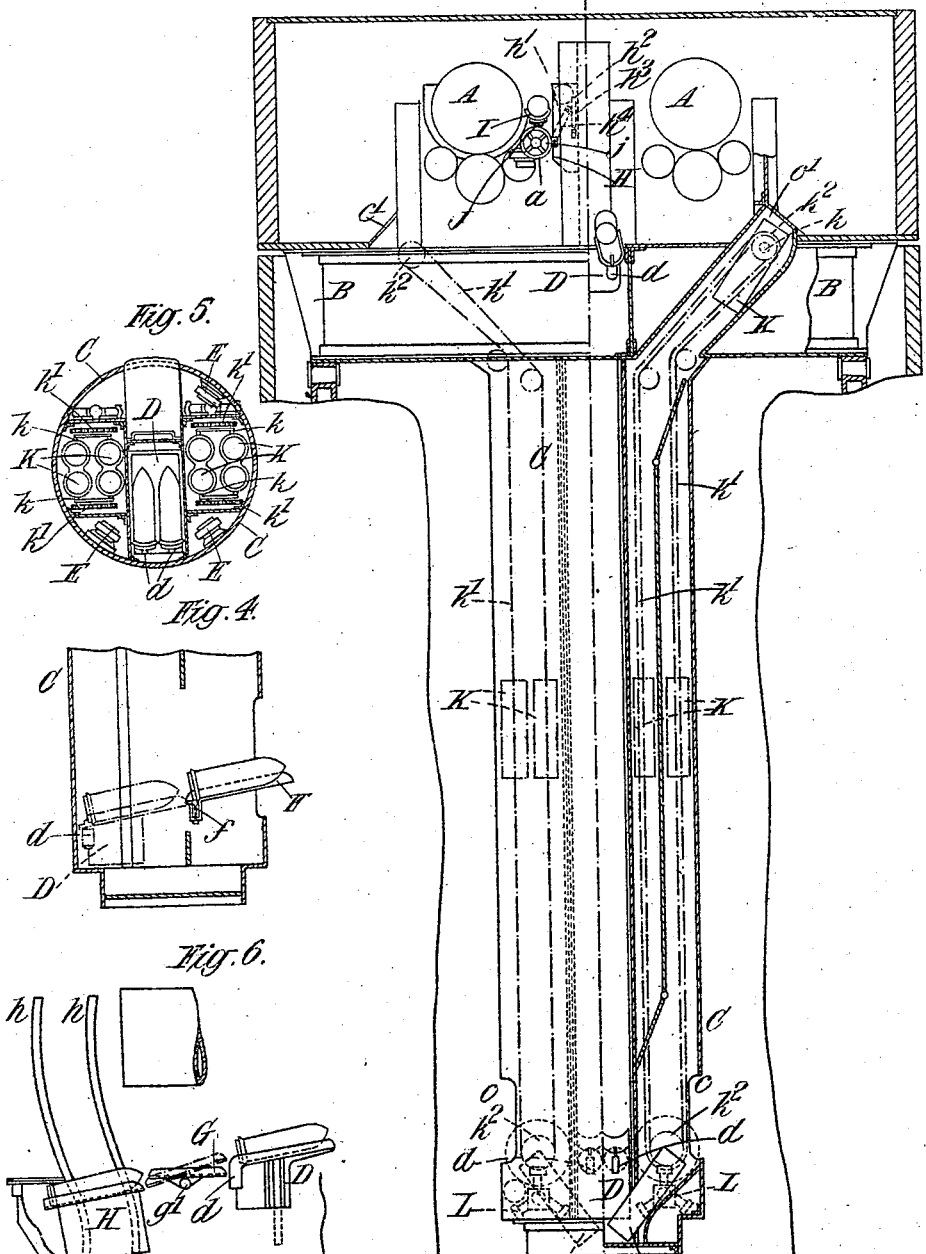

No. 847,917. PATENTED MAR. 19, 1907.
A. T. DAWSON & J. HORNE.
AMMUNITION HOISTING APPARATUS FOR ORDNANCE.
APPLICATION FILED DEC. 7, 1903.
4 SHEETS—SHEET 3.
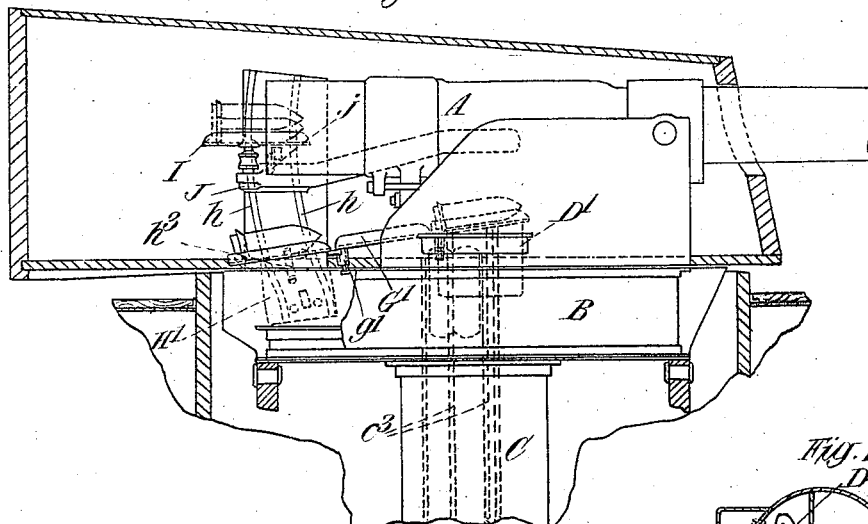
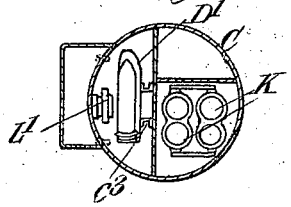
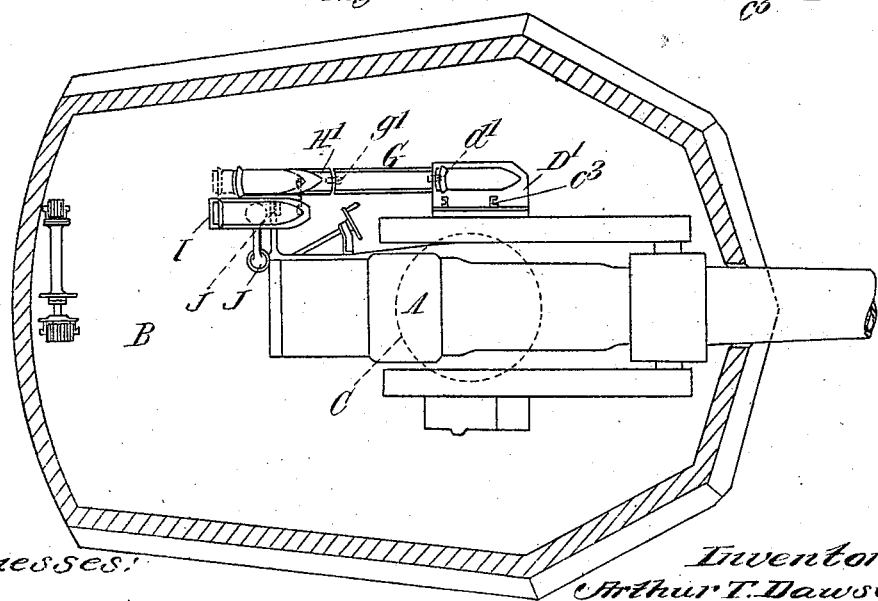
Witnesses:
Inventors
Arthur T. Dawson
James Horne
By
James L. Norris.
Atty.

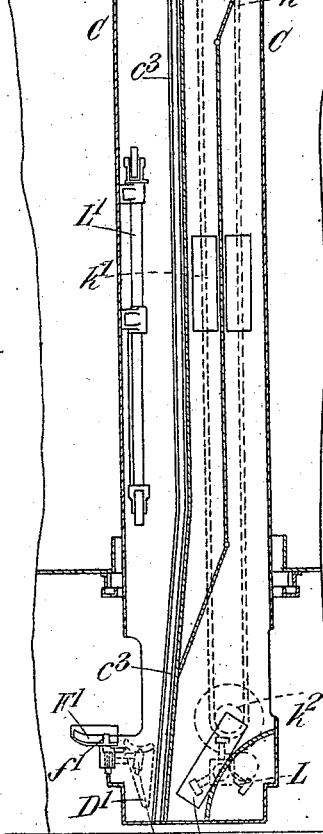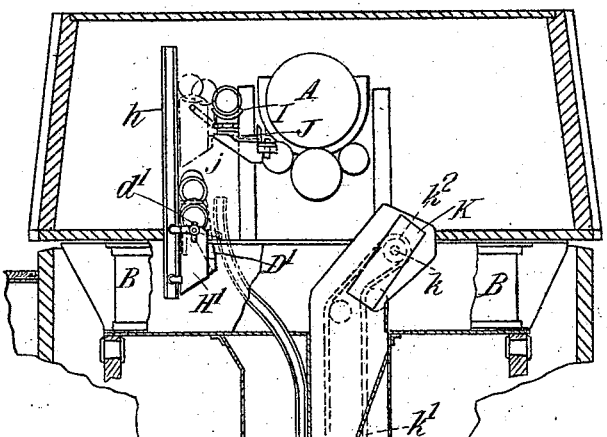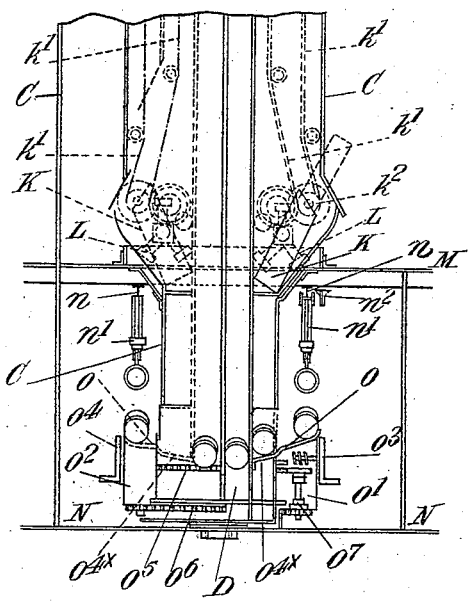

UNITED STATES PATENT OFFICE.

ARTHUR TREVOR DAWSON, OF WESTMINSTER, AND JAMES HORNE, OF BARROW-IN-FURNESS, ENGLAND, ASSIGNORS TO VICKERS SONS & MAXIM LIMITED, OF WESTMINSTER, ENGLAND.

AMMUNITION-HOISTING APPARATUS FOR ORDNANCE.

No. 847,917. Specification of Letters Patent. Patented March 19, 1907

Application filed December 7, 1903. Serial No. 184,225.

*To all whom it may concern:*

Be it known that we, ARTHUR TREVOR DAWSON, lieutenant of the Royal Navy, director and superintendent of ordnance works, a subject of the King of Great Britain, residing at 32 Victoria street, Westminster, in the county of London, England, and JAMES HORNE, engineer, a subject of the King of Great Britain, of Vickers Sons & Maxim Limited, Naval Construction Works, Barrow-in-Furness, in the county of Lancaster, England, have invented certain new and useful Improvements in and Relating to Ammunition-Hoisting Apparatus for Ordnance, of which the following is a specification.

This invention has reference to ammunition-hoisting apparatus for ordnance, and relates particularly to the class of ordnance that is mounted on a revolving turn-table having a circular or cylindrical trunk that revolves with said turn-table and extends down to the ammunition-supply rooms.

According to our invention the shell and powder charges are conveyed separately to the gun-platform, the shells being delivered between the guns (if there are two) by one or two direct hoists and the powder charges being delivered at points outside the guns by two separate hoists. At the gun-platform inclined receiving-trays are provided for the shells elevated by the shell-hoists, said trays being so arranged that the shells will enter them automatically from the shell-hoists and leave them automatically to enter auxiliary lifting-cages, by which the shells are deposited into radial or swinging loading-trays carried by an oscillatory part of the gun-mounting and by which the shells are brought into alinement with the gun-breech, these auxiliary lifting-cages being situated at the rear of and laterally with respect to the gun. The receiving-trays may be either fixed or pivoted. When our invention is applied to a single gun mounted on a revolving turn-table having a circular or cylindrical trunk, as above stated, the shells and the powder charges are conveyed separately to opposite sides of the gun-platform, the shells being automatically received by a fixed or pivoted inclined tray at the gun-platform and automatically deposited from the said tray into an auxiliary lifting-cage for conveyance to the radial or swinging loading-tray, as in the arrangement for the double gun-mounting. The said auxiliary lifting-cages are adapted to move along guide-rails that are curved in a path concentric with the gun-trunnions, so that said auxiliary lifting-cages will elevate the shells to a position approximately parallel to the axis of the gun at all angles of elevation of the latter.

In order that our said invention may be clearly understood and readily carried into effect, we will describe the same more fully with reference to the accompanying drawings, in which—

Figure 1 is a longitudinal section, Fig. 2 a transverse section, and Fig. 3 a sectional plan, of a pair of guns mounted "*en barbette*" and provided with our improved ammunition-hoisting apparatus having a single shell-hoist delivering the shells between the guns and two powder-hoists delivering the powder charges to the outside of the guns. Fig. 4 is a vertical section of the lower part of the revolving trunk. Fig. 5 is a horizontal section of said trunk. Fig. 6 is a detail view showing the aforesaid inclined receiving-tray when made pivotal. Fig. 7 is a longitudinal section, Fig. 8 a transverse section, and Fig. 9 a sectional plan, showing our hoisting apparatus applied to a single gun mounted *en barbette*. Fig. 10 is a horizontal section through the revolving trunk. Fig. 11 is a sectional elevation of the lower part of the hoist, showing a modification in which the shells are supplied to the said hoist at a point or level below that at which the powder charges are supplied thereto.

In all these figures like letters of reference indicate similar parts.

A A are the guns. B is the revolving turn-table on which they are mounted, and C the circular or cylindrical trunk that revolves with said turn-table.

Referring more particularly to Figs. 1 to 5, the shells are conveyed in pairs to the gun-platform in a single hoisting-cage D, which travels vertically in guides in the central portion of the trunk C and which is lifted by means of a wire rope actuated by a hydraulic press E or other suitable means. The shells are conveyed from the shell-rooms by an overhead trolley and deposited on an inclined tray F, attached to the bottom of the trunk, where they are retained by suitable stops $f$, Fig. 4, which are liberated when the hoisting-cage D is in the proper position at the bottom of the hoist for receiving the shells. The shells are then free to slide into the hoisting-cage and on so doing come to rest against suitable stops $d\ d$ at the rear of the latter. These stops when the cage D has arrived at the gun-platform are automatically released, thereby permitting the shells which are carried by the cage in an inclined position to slide from said cage onto the fixed inclined receiving-trays G G, Figs. 1 and 3, at the gun-platform. Stops $g\ g$ are likewise provided at the rear of these receiving-trays to retain the shells until auxiliary lifting-cages H H at the gun-platform assume the proper position to receive them, the said stops $g\ g$ being depressed in each case to permit the shells to slide into the respective auxiliary lifting-cages. If desired, two hoisting-cages D with independent hoisting-gear may be employed to raise the shells from the ammunition-room to the gun-platform. The aforesaid auxiliary lifting-cages H at the gun-platform are raised vertically on guide-rails $h\ h$, Fig. 1, which are curved to form a path concentric with the gun-trunnions, so that the shells may be brought to a position approximately parallel to the center or axial line of the guns and convenient for being tilted into radial or swinging loading-trays I I, carried by the loading-arm J or an extension on the gun-slide irrespective of the position of the guns in elevation or depression. Compensating gear (which may be of the kind described in the specification of our previous British Patent No. 9,415, dated May 4, 1899) may be provided to give corresponding movement to the auxiliary lifting-cages, so that the position of the auxiliary cage relative to the loading-tray in each case will remain unaltered while the shell is being tilted should the gun during such time be elevated or depressed. The trays $h'\ h'$ on these auxiliary lifting-cages are pivoted at $h^2$ on their horizontal axes and are retained in their correct positions by suitable springs $h^3$ or other resilient devices. Levers $h^4\ h^4$, which may be attached to the respective trays on the auxiliary lifting-cages, are so arranged as to engage with cams $a\ a$ or the like on the gun-cradle, so as to automatically tilt the trays and cause the shells carried by them to roll into the radial or swinging loading-trays I I. Stops $j\ j$, formed on the loading-arm J or an extension on the gun-slide, are provided to arrest the auxiliary lifting-cage in the correct position for depositing the projectiles into the radial or swinging loading-trays I. The said radial loading-trays (which may be of the kind described in the specification of our previous British Patent No. 9,417, dated May 4, 1899) can then be swung into the breech of the gun and the shells rammed.

The hoist for conveying the powder charges to the gun-platform may be of the endless-chain type carrying a series of vertical double buckets K K, each bucket receiving two half-charges. The buckets are suspended on suitable pivots $k$ between the chains $k'$, which are arranged to pass over sprocket-wheels $k^2$ at the top and bottom of the hoist and are deflected by suitable means into convenient positions for loading and unloading them. The buckets are so arranged in their respective hoists that when one is in the loading position at the bottom another is in the unloading position at the top. There are two openings $c\ c$, Fig. 2, at the bottom of the trunk C for loading and two openings $c'\ c'$ at the gun-platform for unloading, one opening being on each side of the gun-platform. The hoists are driven through suitable gearing by hydraulic or other motors L L. A passage may be provided in the trunk for taking up the ammunition by hand. This passage may also be used as a ladder-way for access from the ammunition-rooms to the gun-platform. An opening $b$, Fig. 3, on the gun-platform communicates with the said passage. Automatic gear will be provided to stop the buckets at the loading and unloading positions, these stoppages being arranged to take place at the same time.

If it should not be possible to obtain the proper angle or continuous inclination of the shell-hoisting cage D, the inclined receiving-tray G, and the auxiliary lifting-cage H, which is desirable when the hoisting-cage is fully raised and the auxiliary lifting-cage is fully lowered to bring these two cages in alinement with the said inclined receiving-tray, and thus make it certain that the shell will automatically travel, as required from one cage to the other under all conditions of heel of the ship, the inclined receiving-tray may be carried on a horizontal pivot $q'$, Fig. 6, situated near its center, and may be arranged to receive the shell in a comparatively horizontal position. Said tray may then be tilted by means of a lever worked by hand or automatically as the auxiliary lifting-cage descends, and said tray would be thus caused to assume a sufficient inclination for the shell to slide from it into the auxiliary lifting-cage, as shown in Fig. 6.

We now refer to Figs. 7 to 10, which illustrate our ammunition-hoisting apparatus applied to a single gun mounted *en barbette*. In this case the gun is mounted (as before stated with respect to the double gun-mounting) on a revolving turn-table B, to which is attached the circular or cylindrical trunk C, that revolves with the turn-table and extends down to the ammunition-supply rooms. The shells and powder charges are conveyed separately to opposite sides of the gun-platform. The shells are raised to the gun-platform in a hoisting-cage D′, which travels vertically in guides $c^3$ in the trunk C and is deflected through the turn-table B, so as to deliver its load at one side of the gun-mounting. The said hoisting-cage is lifted by means of a wire rope carried over suitable sheaves and actuated by a hydraulic press L' or other suitable means. The shells are conveyed from the shell-room by an overhead trolley and deposited on a loading-tray F', which is inclined longitudinally at a similar angle to that of the tray of the hoisting-cage. Stops $f'$ are provided on the said loading-tray F' to prevent the shell from being pushed into the hoistway unless the hoisting-cage is in proper position for its reception. The hoisting-cage as it comes into position at the lower end of the hoist is arranged to automatically depress the stops $f'$, thereby permitting the shell to be rolled onto the tray of the cage D'. A stop $d'$ is arranged at the rear of the hoisting-cage to prevent the shell from moving backward until the cage has reached the gun-platform, when said stop is automatically displaced, thus permitting the shell to slide onto the fixed inclined receiving-tray G' at the gun-platform. A stop $g'$ is likewise provided at the rear of this receiving-tray to retain the shell until the auxiliary lifting-cage H' at the gun-platform has descended into the proper position to receive it, the stop $g'$ at the rear of the receiving-tray being then automatically displaced, so as to permit the shell to slide into the auxiliary cage. The said auxiliary cage is raised vertically on guide-rails $h\ h$, which are curved in a path concentric with the gun-trunnions, so that the shell may be brought to a position approximately parallel to the center line or axis of the gun and convenient for being tilted into the radial or swinging loading-tray I irrespective of the position of the gun in elevation or depression. A stop $j$ is provided on the loading-arm J or bracket to arrest the cage in the correct position for tilting. The auxiliary cage is provided with compensating gear, so that the relative position of the cage and loading-tray remains unaltered during the tilting of the shell, should the gun at this time be elevated or depressed, as explained with reference to the double gun-mounting above referred to. The loading-tray on this auxiliary cage may be similar in construction and arrangement to that explained with reference to the double gun-mounting. The hoist for conveying the powder charges to the gun-platform may be constructed and arranged in an analogous manner to that above described with reference to the double gun-mounting. A space is provided in the revolving trunk for taking up the ammunition by hand, and an opening in the gun-platform communicates with this passage, as above described.

In the arrangement illustrated by Fig. 11 we have shown the lower end of the trunk C extended downwardly below the floor M of the powder-room to the floor N of the shell-room, which is situated beneath the powder-room. In this case the shells are transported from storage-bins along overhead transporting-rails $n$ by runners $n'$, worked by a hydraulic press $n^2$ or by hand. The shells are deposited by the runners onto suitably-arranged receiving-trays O, carried by independently-revolving bogies O' O² at the lower end of the said trunk, which bogies are worked by hand-wheels O³ O⁴, so that the shells received by said trays from the runners can be brought into position to be supplied to waiting trays $O^{4\times}$, carried by the trunk in whatever position these waiting-trays may assume by the rotation of the trunk and in that way be supplied to the shell-cage D. In order to enable the said rotating bogies to work relatively to the trunk or to the ship, two separate toothed rings O⁵ O⁶ are provided—one on the revolving trunk and the other attached to the ship, to either of which they can be connected at will by means of a clutch on the vertical shaft $O^7$.

What we claim, and desire to secure by Letters Patent of the United States, is—

1. In ammunition-hoisting apparatus for ordnance, the combination with the revolving trunk of the turn-table, of hoists for conveying the shell and powder charges separately up said trunk to the gun-platform, from shell and powder rooms, waiting trays within the shell-room and arranged in operative relation with respect to the trunk and from which trays the shells are adapted to be supplied to the shell-hoist, shiftable receiving-trays arranged in operative relation with respect to the trunk and from which trays the shells are adapted to be supplied to the waiting trays, means for shifting the receiving-trays, an auxiliary lifting-cage situated at the rear of the gun, means for automatically transferring the shell from the shell-hoist to the said auxiliary lifting-cage, a swinging loading-tray carried by an oscillatory part of the gun-mounting, means for transferring the shells from the auxiliary lifting-cage to the swinging loading-tray, and means for actuating said swinging loading-tray to bring the shell it contains in alinement with the gun-breech, substantially as described.

2. In ammunition-hoisting apparatus for ordnance, the combination with the revolving trunk of the turn-table, of hoists for conveying the shell and powder charges separately up said trunk to the gun-platform, from shell and powder rooms, waiting trays within the shell-room and arranged in operative relation with respect to the trunk and from which trays the shells are adapted to be supplied to the shell-hoist, shiftable receiving-trays arranged in operative relation with respect to the trunk and from which trays the shells are adapted to be supplied to the waiting trays, means for shifting the receiving-trays, an auxiliary lifting-cage situated at the rear of the gun, a receiving-tray located on the gun-platform at a point between the shell-hoist and the auxiliary lifting-cage when these are respectively at their highest and lowest positions, means for regulating the passage of the shells from the shell-hoist to the receiving-tray and from the latter to the auxiliary lifting-cage, a swinging loading-tray carried by an oscillatory part of the gun-mounting, means for laterally tilting the loading-cage to deposit its shell into the said swinging loading-tray when opposite the latter, and means for actuating said swinging loading-tray to bring the shell it contains in alinement with the gun-breech, substantially as described.

3. In ammunition-hoisting apparatus for ordnance, the combination with the revolving trunk of the turn-table, of hoists for conveying the shell and powder charges separately up said trunk to the gun-platform, from shell and powder rooms, waiting trays within the shell-room and arranged in operative relation with respect to the trunk and from which trays the shells are adapted to be supplied to the shell-hoist, shiftable receiving-trays arranged in operative relation with respect to the trunk and from which trays the shells are adapted to be supplied to the waiting trays, means for shifting the receiving-trays, an auxiliary lifting-cage situated at the rear of the gun, a pivoted receiving-tray located on the gun-platform at a point between the shell-hoist and the auxiliary lifting-cage, when these are respectively at their highest and lowest positions, means for regulating the passage of the shells from the shell-hoist to the pivoted receiving-tray and from the latter to the auxiliary lifting-cage, a swinging loading-tray carried by an oscillatory part of the gun-mounting, means for laterally tilting the loading-cage to deposit its shell into the said swinging loading-tray when opposite the latter, and means for actuating said swinging loading-tray to bring the shell it contains in alinement with the gun-breech, substantially as described.

4. In ammunition-hoisting apparatus for ordnance, the combination with the revolving trunk of the turn-table, of an intervening floor between the shell-room and powder-room hoists whereby the shell and powder charges are conveyed separately up said trunk to the gun-platform from rooms situated one below the other, waiting trays permanently carried by the revolving trunk at a point within the shell-room and from which trays the shells are adapted to be supplied to the shell-hoists, and means for supplying the waiting trays with the shells.

5. In ammunition-hoisting apparatus for ordnance, the combination with the revolving trunk of a turn-table, of hoists whereby the shell and powder charges are conveyed separately up said trunk to the gun-platform from rooms situated one below the other, waiting trays carried by the portion of the trunk that extends into the shell-room and from which trays the shells are adapted to be supplied to the shell-cage, receiving-trays carried by bogies at the lower end of the trunk, means for transferring the shells from the shell-bins to the receiving-trays, and means for independently rotating the bogies relatively to the trunk or to the structure for the purpose specified.

6. In ammunition-hoisting apparatus for ordnance, the combination with the revolving trunk of the turn-table, of hoisting means whereby the shell and powder charges are conveyed separately up said trunk to the gun-platform from rooms situated one below the other, a waiting tray arranged in the shell-room and from which tray the shell is adapted to be supplied to the shell-cage, a shiftable receiving-tray arranged at the lower end of the trunk, means for transferring the shells from the shell-bins to the receiving-tray, and means for shifting the receiving-tray.

7. In ammunition-hoisting apparatus for ordnance, the combination with the revolving trunk of the turn-table, of hoisting means whereby the shell and powder charges are conveyed separately up said trunk to the gun-platform from rooms situated one below the other, waiting trays within the shell-rooms and arranged in operative relation with respect to the trunk and from which trays the shells are adapted to be supplied to the shell-hoist, shiftable receiving-trays within the shell-room and arranged in operative relation with respect to the trunk, means for transferring the charges from the shell-bins to the receiving-trays, and means for suitably shifting the receiving-trays.

8. In ammunition-hoisting apparatus for ordnance, the combination with the revolving trunk of the turn-table, of hoists for conveying the shell and powder charges separately up said trunk to the gun-platform from rooms situated one below the other, waiting trays carried by that portion of the trunk that extends into the shell-room and from which trays the shells are adapted to be supplied to the shell-hoist, receiving-trays carried by bogies at the lower end of the trunk, means for transferring the shells from the shell-bins to the receiving-trays, means for independently rotating the bogie relatively to the trunk or to the structure, an auxiliary lifting-cage situated at the rear of the gun, means for automatically transferring the shells from the hoist to the said auxiliary lifting-cage, a swinging loading-tray carried by an oscillatory part of the gun-mounting, means for transferring the shells from the auxiliary lifting-cage to the swinging loading-tray, and means for actuating said swinging loading-tray to bring the shell it contains in alinement with the gun-breech, substantially as described.

9. In ammunition-hoisting apparatus for ordnance, the combination with the revolving trunk of the turn-table, of hoists for conveying the shell and powder charges separately up said trunk to the gun-platform from rooms situated one below the other, waiting trays carried by the portion of the trunk that extends into the shell-room and from which trays the shells are adapted to be supplied to the shell-hoist, receiving-trays carried by bogies at the lower end of the trunk, means for independently rotating the bogies relatively to the trunk, an auxiliary lifting-cage arranged in operative relation with respect to the gun, a receiving-tray located on the gun-platform at a point between the shell-hoist and the auxiliary lifting-cage when they are respectively at their highest and lowest positions, means for regulating the passage of the shells from the shell-hoist to the receiving-tray and from the latter to the auxiliary lifting-cage, a swinging loading-tray carried by an oscillatory part of the gun-mounting, means for laterally tilting the loading-cage to deposit its shell into the said swinging loading-tray when opposite the latter, and means for actuating said swinging loading-tray to bring the shells it contains in alinement with the gun-breech, substantially as described.

10. In ammunition-hoisting apparatus for ordnance, the combination with the revolving trunk of the turn-table, of hoists for conveying the shells and powder charges separately up said trunk to the gun-platform from rooms situated one below the other, waiting trays carried by the portion of the trunk that extends into the shell-room and from which trays the shells are adapted to be supplied to the shell-hoist, receiving-trays carried by bogies at the lower end of the trunk, means for transferring the shells from the shell-bins to the receiving-trays, means for independently rotating the bogies relatively to the trunk, an auxiliary lifting-cage arranged in operative relation with respect to the gun, a pivoted receiving-tray located on the gun-platform at a point between the shell-hoist and the auxiliary lifting-cage, when these are respectively at their highest and lowest positions, means for regulating the passage of the shell from the shell-hoist to the pivoted receiving-tray and from the latter to the auxiliary lifting-cage, a swinging loading-tray carried by an oscillatory part of the gun-mounting, means for laterally tilting the loading-cage to deposit its shell into said swinging loading-tray when opposite the latter, and means for actuating said swinging loading-tray to bring the shell it contains in alinement with the gun-breech, substantially as described.

In testimony whereof we have hereunto set our hands, in presence of two subscribing witnesses, this 26th day of November, 1903.

ARTHUR TREVOR DAWSON.
JAMES HORNE.

Witnesses to the signature of Arthur Trevor Dawson:
C. A. SEARLE,
HENRY KING.

Witnesses to the signature of James Horne:
R. B. D. BRADSHAW,
W. H. ATKINSON.